US007286161B2

(12) United States Patent
Watanabe et al.

(10) Patent No.: US 7,286,161 B2
(45) Date of Patent: Oct. 23, 2007

(54) DIGITAL CAMERA, IMAGE PROCESSING APPARATUS, IMAGE PROCESSING METHOD, IMAGE PROCESSING SYSTEM, AND PROGRAM FOR SETTING PLURAL TRIMMING AREAS WITH RESPECT TO IMAGE DATA

(75) Inventors: Hitoshi Watanabe, Kanagawa (JP); Chiyumi Niwa, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 713 days.

(21) Appl. No.: 10/368,617

(22) Filed: Feb. 20, 2003

(65) Prior Publication Data
US 2003/0156197 A1 Aug. 21, 2003

(30) Foreign Application Priority Data
Feb. 21, 2002 (JP) ............................. 2002-044647
May 22, 2002 (JP) ............................. 2002-147900

(51) Int. Cl.
*H04N 5/225* (2006.01)
*H04N 5/222* (2006.01)

(52) U.S. Cl. ................ 348/207.2; 348/333.02
(58) Field of Classification Search ........... 348/231.99, 348/207.2, 333.01, 333.02, 333.05
See application file for complete search history.

(56) References Cited

U.S. PATENT DOCUMENTS

| 5,499,068 | A | * | 3/1996 | Satoh et al. | .................. 396/55 |
|---|---|---|---|---|---|
| 5,666,471 | A | * | 9/1997 | Fujii | .......................... 358/1.18 |
| 5,710,954 | A | * | 1/1998 | Inoue | .......................... 396/374 |
| 6,111,605 | A | * | 8/2000 | Suzuki | .................... 348/220.1 |
| 6,164,839 | A | | 12/2000 | Watanabe | .................... 395/292 |
| 6,657,658 | B2 | * | 12/2003 | Takemura | .............. 348/207.99 |
| 6,686,964 | B1 | * | 2/2004 | Makishima et al. | ... 348/333.02 |
| 6,750,903 | B1 | * | 6/2004 | Miyatake et al. | ......... 348/218.1 |
| 2002/0118964 | A1 | * | 8/2002 | Enomoto | ..................... 396/60 |
| 2006/0114339 | A1 | * | 6/2006 | Ohmura et al. | ........ 348/231.99 |

FOREIGN PATENT DOCUMENTS

| EP | 1 056 052 | 11/2000 |
|---|---|---|
| JP | 10-200850 | 7/1998 |
| JP | 2000-275722 | 10/2000 |

* cited by examiner

*Primary Examiner*—Vivek Srivastava
*Assistant Examiner*—Kelly Jerabek
(74) *Attorney, Agent, or Firm*—Fitzpatrick, Cella, Harper & Scinto

(57) ABSTRACT

The present invention relates to a digital camera, an image processing apparatus, an image processing method, an image processing system, and a program in which, plural trimming areas are set to image data displayed on a display, and the image data corresponding to the respective set trimming areas are continuously output and printed by a printer.

14 Claims, 9 Drawing Sheets

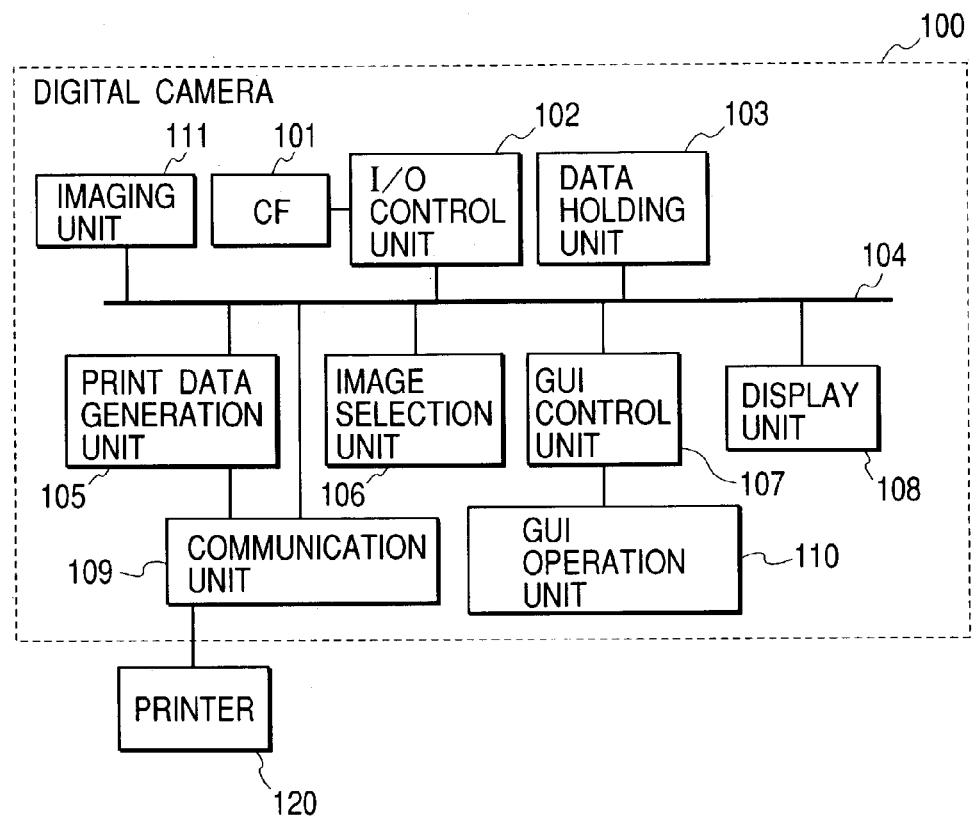
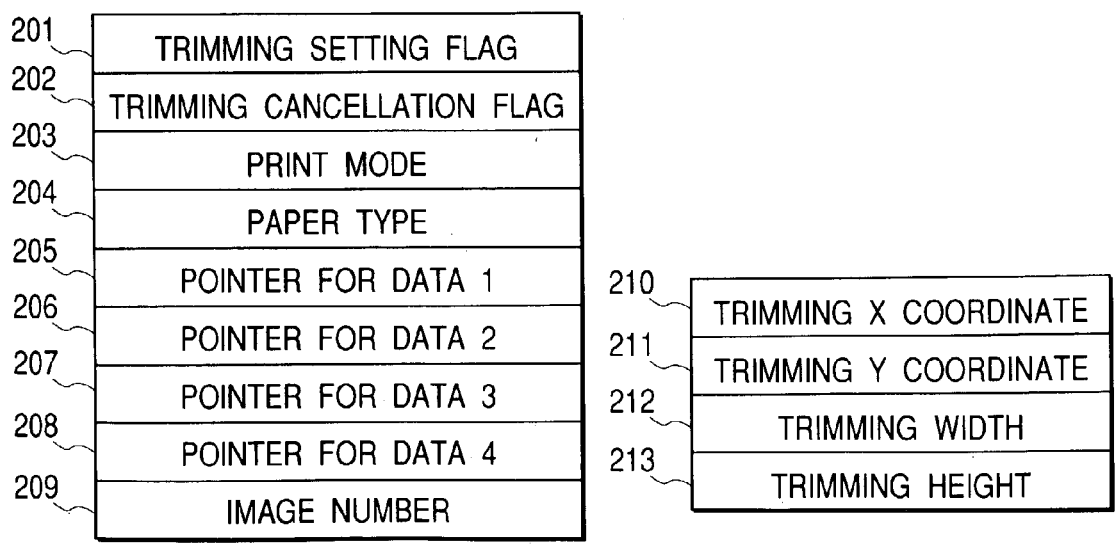

FIG. 10
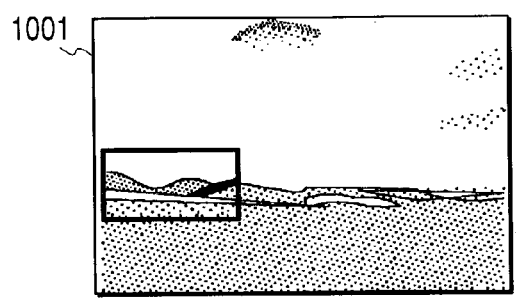
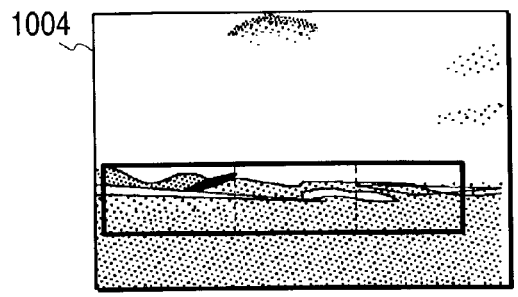
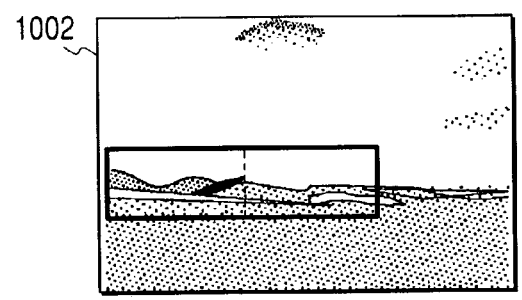
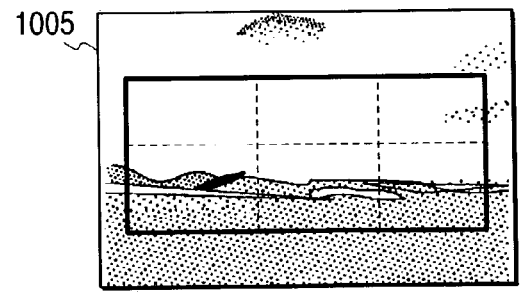
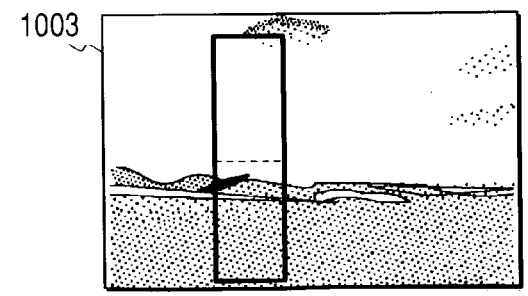

FIG. 11

| |
|---|
| 1101 — TRIMMING SETTING FLAG |
| 1102 — TRIMMING CANCELLATION FLAG |
| 1103 — PRINT MODE |
| 1104 — PAPER TYPE |
| 1105 — TRIMMING X COORDINATE |
| 1106 — TRIMMING Y COORDINATE |
| 1107 — TRIMMING WIDTH |
| 1108 — TRIMMING HEIGHT |
| 1109 — THE NUMBER OF X-DIRECTION TRIMMINGS |
| 1110 — THE NUMBER OF Y-DIRECTION TRIMMINGS |
| 1111 — IMAGE NUMBER |

DIGITAL CAMERA, IMAGE PROCESSING APPARATUS, IMAGE PROCESSING METHOD, IMAGE PROCESSING SYSTEM, AND PROGRAM FOR SETTING PLURAL TRIMMING AREAS WITH RESPECT TO IMAGE DATA

BACKGROUND OF THE INVENTION

1. Field of the Invention

The present invention relates to a digital camera, an image processing apparatus, an image processing method and an image processing system which perform a process for trimming an image for printing, and a program for executing the above image processing method.

2. Related Background Art

Conventionally, in case of connecting a camera with a printer, performing trimming of a part of an image held in the camera, and then printing the trimming-processed image using a printer, a user performs trimming setting operation while watching an original image, prints the trimming-processed image, then performs another trimming setting operation while watching the image, and prints that trimming-processed image. That is, the trimming setting operation and printing operation are alternately repeated.

Moreover, in case of performing different trimming operation to an identical image, it is necessary to perform the trimming setting operations while comparing a print result output on a paper or the like with an image on a display device.

On one hand, in case of performing trimming of a part of the image held in the camera and then printing the trimming-processed image, if the size of the output paper or the like is limited, it is known that the trimming to the same size is designated respectively to adjacent areas on the original image, and the plural trimming-processed images are printed. Then, the printed outputs are aligned, whereby a panoramic image is formed. In the conventional technique, a trimming setting is performed every time a print output of the image is performed. That is, the user performs a trimming setting operation of the same size on the area adjacent to the area which previously has been subjected to the trimming setting operation, while comparing the image already printed on the paper with the image presently displayed on the display device. Thus, it is necessary to alternately repeat the trimming setting operation and printing operation.

As described above, in such a conventional related background art, even in the case where the plural different trimmings operation and printing operations are performed to the identical image, it is necessary to reperform the trimming setting operation every time the printing of one trimming-processed image ends. Here, a certain time is necessary to perform the printing of one trimming-processed image, and the user has to wait for the end of the printing of one trimming-processed image and then perform next trimming setting operation. Thus, there is a problem that it takes a long time to complete continuous printing.

Moreover, when the user performs the next trimming setting operation, while watching and observing the result of the previous printing of the trimming-processed image, he has to perform the next trimming setting operation while comparing the image already printed on the paper with the image presently displayed on the display device of the camera or the printer. Thus, there is a problem that it is impossible to provide a user-friendly printing system.

Moreover, in the above conventional related background art, when a panoramic image is formed by appropriately aligning the plural printed outputs obtained from the adjacent areas and based on the same-sized trimmings, it is necessary to reperform the trimming setting operation every time the printing of one trimming-processed image ends. Here, since a certain time is necessary to perform the printing of one trimming-processed image, the user has to be on standby while the printing is being performed. Thus, the user has to wait for the end of the printing of one trimming-processed image and then perform the next trimming setting operation. Moreover, when the user performs the next trimming setting operation while watching and observing the result of the previous trimming processed image printing, he has to set trimming frames of the same size on the adjacent areas while comparing the image already printed on the paper with the image presently displayed on the printing system. Thus, there is the problem that it is impossible to provide a user-friendly printing system.

SUMMARY OF THE INVENTION

The present invention has been accomplished in order to solve the above conventional problems, and an object thereof is to provide a digital camera, an image processing apparatus, an image processing method and an image processing system which improve operability of continuous printing in a trimming printing operation, and a program which is to execute the above image processing method.

As a means for achieving the above object, the present provides a digital camera comprising:

a display means for displaying image data;

a setting means for setting plural trimming areas to the image data; and print control means for causing a print device to continuously print and output the image data corresponding to each trimming area set by the setting means.

Another object of the present invention is to provide a digital camera, an image processing apparatus, an image processing method and an image processing system which simplifies comparison of plural settings concerning a trimming printing operation, and a program which is to execute the above image processing method.

As a means for achieving the above object, the present provides an image processing apparatus which performs a process for trimming-processed image printing,comprising:

a display means for displaying image data;and a setting means for setting plural trimming areas to the image data, wherein the setting means causes the display means to display trimming frames of the set plural trimming areas set by the setting means so as to superimpose each trimming frame on the image data.

Still another object of the present invention is to provide a digital camera, an image processing apparatus, an image processing method and an image processing system which simplifies trimming setting operation concerning a panoramic printing operation, and a program which execute the above image processing method.

As a means for achieving the above object, the present provides an image processing apparatus which performs a process for trimming-processed image printing, comprising:

display means for displaying image data; and setting means for setting plural trimming areas to the image data, wherein the setting means sets the plural trimming areas by dividing one designated trimming area, and causes the display means to display trimming frames of the trimming areas set by the means.

BRIEF DESCRIPTION OF THE DRAWINGS

The above objects of the present invention will become apparent from the attached drawings and the detailed explanation based on those drawings.

FIG. 1 is a block diagram showing the structure of a print system according to the present invention;

FIG. 2 is a view showing the structure of trimming data in the first embodiment;

FIG. 10 is a view showing a state of dividing a trimming setting area into lattice-like areas in a screen where the trimming setting operation according to the second embodiment is performed;

FIG. 11 is a view showing the structure of trimming data in the second embodiment;

DESCRIPTION OF THE PREFERRED EMBODIMENTS

Figure 3:
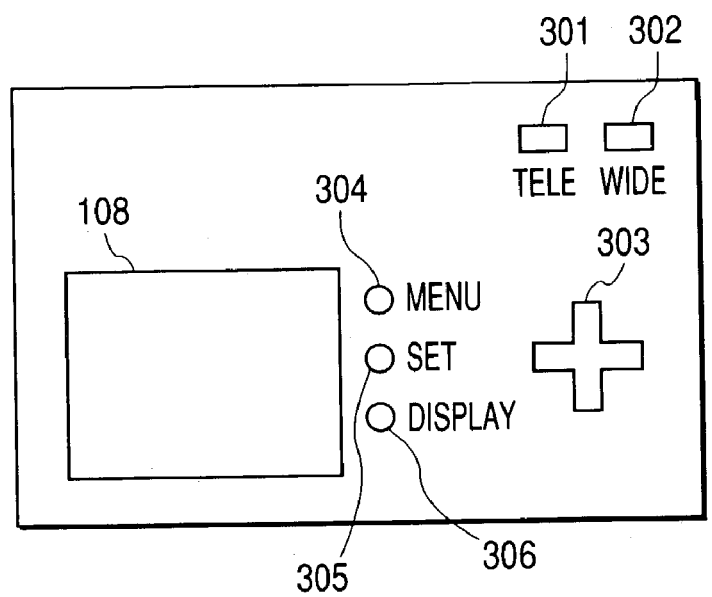
FIG. 3 is a view showing a GUI (Graphical User Interface) operation unit.

Hereinafter, the embodiments of the present invention will be explained with reference to the attached drawings.

First Embodiment

FIG. 1 is a block diagram showing the structure of a print system which includes a digital camera 100 and a printer 120 according to the present invention.

It is assumed that image data shot by an imaging unit 111 is recorded in a CF (Compact Flash) 101 being a removal flash memory card. A user performs various operations by operating a GUI operation unit 110. The GUI operation unit 110 is connected to a GUI control unit 107, which interprets an operation performed by the user in accordance with the conditions and sends commands to each unit through a bus 104 to realize a users request.

An example of the GUI operation unit 110 is shown in FIG. 3. In this example, an operation unit of the digital camera corresponds to the GUI operation unit.

In order to print a recorded image after performing a trimming operation, an image to be printed is selected and then trimming setting operation is performed. More particularly, the user operates the GUI operation unit 110 to display an image selection screen. In this time, a operation performed by the user is interpreted by the GUI control unit 107, which issues an image display command to an image selection unit 106. The image selection unit 106 issues an instruction to an I/O control unit 102 in order to read image data currently selected. The I/O control unit 102 reads designated image data from the CF 101 and sends the image data to a display unit 108 through the bus 104. The display unit 108 displays the sent image data.

The user can select a display format of a screen by the GUI operation unit 110. With respect to the display format, there are a format of displaying a piece of image by using almost an entire area of the display unit 108 and a format of simultaneously and collectively displaying plural pieces of images, of which sizes are reduced, on the display unit 108. When the format of simultaneously displaying the plural pieces of images, of which sizes are reduced, is selected, the image selection unit 106 requires image data necessary for a display to the I/O control unit 102 and then the necessary image data is sent to the display unit 108.

The user selects an image to be printed while watching the images displayed on the display unit 108. If the image currently displayed is to be printed, the user depresses a selection button in the GUI operation unit 110 and then performs the trimming setting operation.

Figure 4:
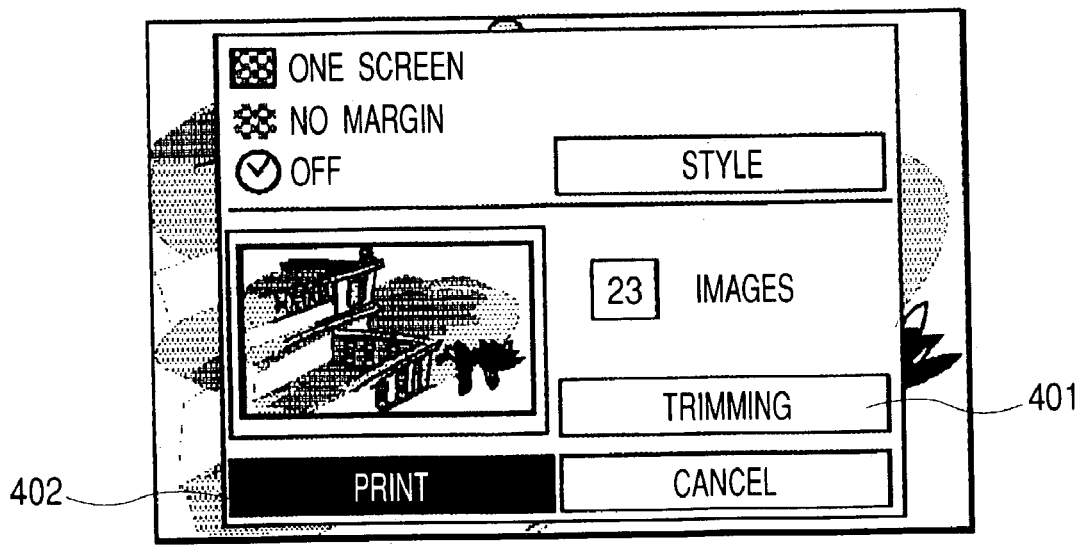
FIG. 4 is a view showing a screen used for performing print setting.

The trimming setting is performed by using such a screen as shown in FIG. 4. When a SET button 305 in the GUI operation unit 110 in a display state for selecting the image, a print dialog box as shown in FIG. 4 is displayed on the image currently displayed on the display unit 108. The user operates a cross-shaped key 303 and selects a trimming button 401. When the user depress the SET button 305 in the GUI operation unit 110 in a display state for selecting the trimming button 401, a trimming setting screen shown in FIG. 5 is displayed on the display unit 108.

Figure 5:
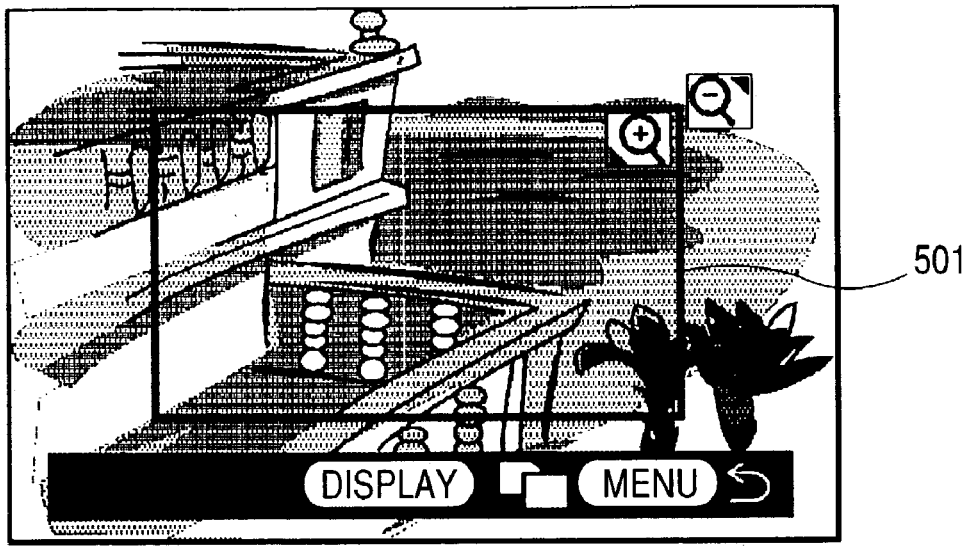
FIG. 5 is a view showing a screen where trimming setting is performed.
Figure 6:
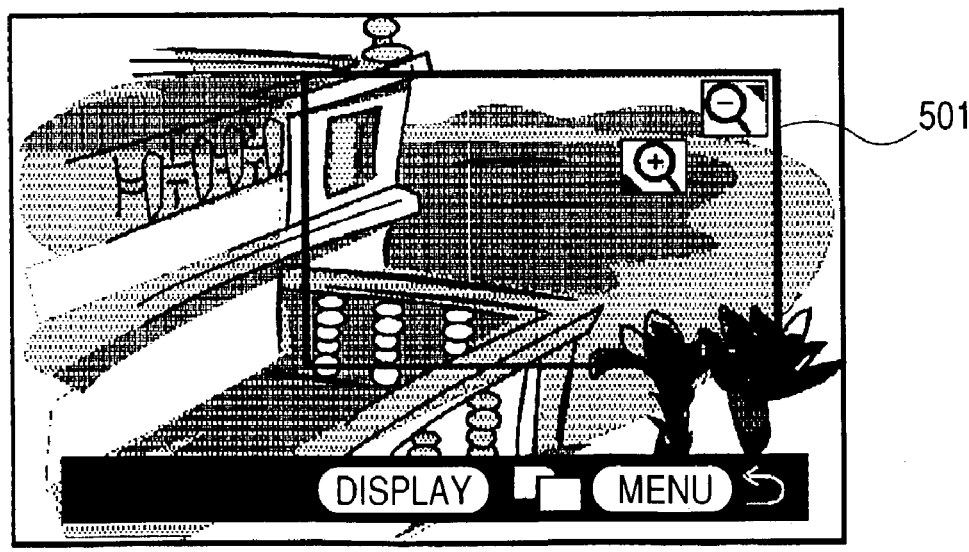
FIG. 6 is a view showing a screen where the trimming setting is performed.

In the display screen shown in FIG. 5, a trimming setting frame 501 is displayed at the center of the screen by green color, in a state superimposed on the selected image. In this state, the user can move the trimming setting frame 501 up and down, right and left on the image by operating the cross-shaped key 303 of the GUI operation unit up and down, right and left respectively. Further, if the user depresses the WIDE key 302 in the GUI operation unit 110, the size of the trimming setting frame is increased. The trimming setting frame 501, of which the size and position are changed (reduced and shifted up to the right), is shown in FIG. 6.

When a maximum sized trimming setting frame 501 is displayed, if the user then again depress the WIDE key 302, the trimming operation is cancelled. After the cancellation, since trimming information before the cancellation is stored, the trimming data before the cancellation can be recalled by resetting the trimming operation.

If the user depresses the TELE key 301 in the GUI operation unit 110, the size of the trimming setting frame is reduced. If the user depress the DISPLAY key 306 in the GUI operation unit 110, the trimming setting frame is rotated 90 degrees.

Figure 7:
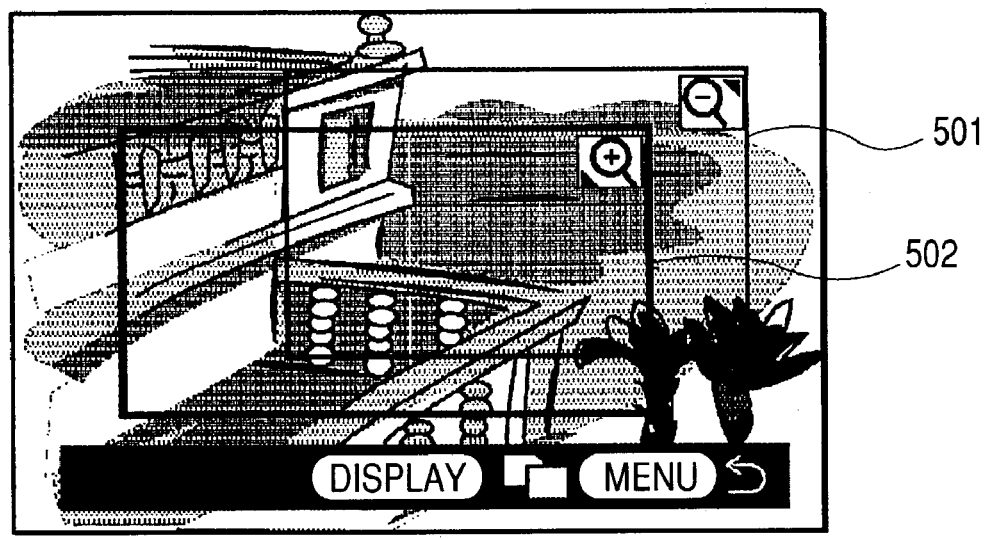
FIG. 7 is a view showing a screen where the trimming setting is performed.
Figure 8:
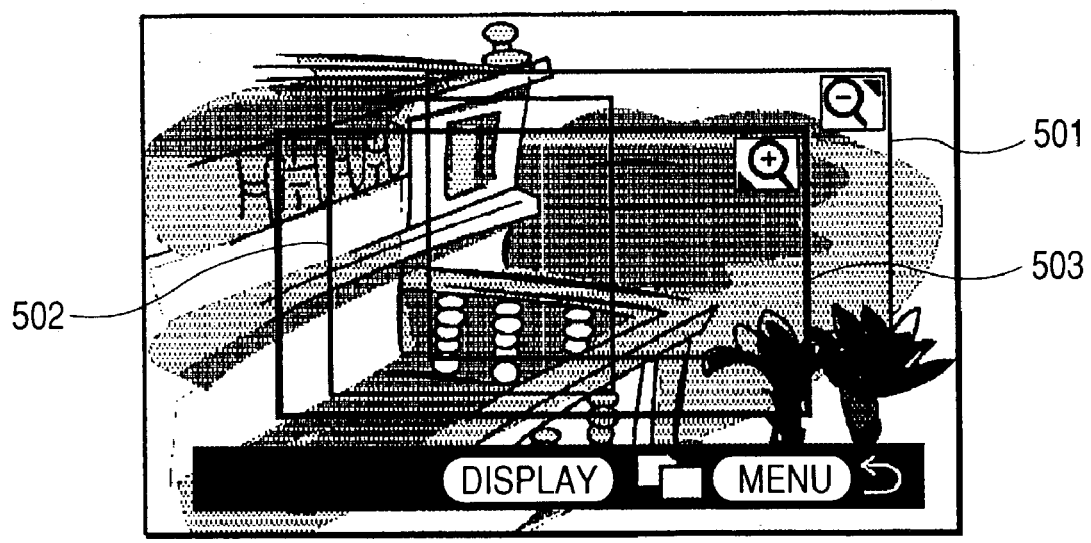
FIG. 8 is a view showing a screen where the trimming setting is performed.

When the position, the size and the longitudinal/lateral directions of a trimming operation are set to the desired condition, if the user depresses the SET key 305 of the GUI operation unit 110, the trimming setting at the present time is fixed, the fixed trimming frame 501 is displayed, e.g., in blue color as shown in FIG. 7, then a new trimming setting frame 502 is displayed at the center of the screen, e.g., in green color. Thereafter, operation performed using the WIDE key 302, the TELE key 301, the DISPLAY key 306 and the cross-shaped key 303 and the cross-shape key 303 of the GUI operation unit 110 does not give any influence on the previously fixed trimming frame 501 but becomes an operation for the new trimming setting frame 502, wherein the size and the position of the trimming setting frame can be changed and/or the trimming setting frame 502 can be rotated 90 degrees. Also, in this time, since the previously fixed trimming frame 501 is displayed, a new trimming setting operation can be performed while comparing with the condition of the previous trimming setting 501. While the trimming setting frame 502 can be displayed at a desired position with the desired size, another new trimming setting frame 503 further maybe be displayed, as shown in FIG. 8, by depressing the SET key 305 of the GUI operation unit 110.

After repeating the necessary trimming settings, if the user depresses the MENU key 304 in the GUI operation unit 110, the trimming setting operation ends, and the print dialog box shown in FIG. 4 is displayed again on the display unit 108. When the print dialog box shown in FIG. 4, is being displayed, the user can select print button 402 by operating the cross-shaped key 303 in the GUI operation unit 110; and when the user depresses the SET button 305 of the GUI operation unit 110, a print process is executed in accordance with the trimming setting.

If a print execution is instructed, print data is generated by a print data generation unit 105. In the print data generation unit 105, the image data currently selected is read from the CF 101 through the image selection unit 106 via the I/O control unit 102. Furthermore, trimming data is read from a data holding unit 103, and a necessary area is extracted from the image data in accordance with the trimming data. The extracted image data is converted into data adapted to the connected printer 120 and the converted data is sent to the printer 120 through a communication unit 109. The printer 120 executes a print process in accordance with the sent print data.

After the printing of one sheet ended, data for the printing is continuously formed in accordance with the next trimming setting, and the print data is similarly sent to the printer to execute a print process according to the next trimming setting. The processes are repeated for all trimming settings until the processes end.

FIG. 2 is a view showing the data structure of the trimming data to be stored at a time of performing a trimming setting operation in the print system of the present embodiment. The trimming data is held (stored) in the data holding unit 103. The trimming data is a structure object consisting of at least six members, and each member has length of four bytes data.

Numeral 201 denotes a trimming setting flag, which can take two values: "true" or "false." If it is in a state of true, it indicates that the contents of the remaining members of the trimming data structure object are meaningful contents. However, if it is in a state of false, it is meaningless even if the remaining members have whatever contents. Therefore, if the trimming setting flag 201 is in a state of false, it is treated that the trimming setting has not been performed.

Numeral 202 denotes a trimming cancellation flag, which can take one of two values of "true" or "false." If it is in a state of true, it indicates that the trimming setting is cancelled. The state that the trimming setting flag 201 is in a state of true and the trimming cancellation flag 202 is in a state of true indicates that the trimming setting is performed and all the members of the trimming data structure object hold meaningful values, however, the trimming process itself is cancelled. If the trimming cancellation flag 202 is in a state of true at a time of printing, a trimming-processed image trimming print is not performed, but rather a print process of an entire image, to which the trimming operation is not performed, is executed.

Numeral 203 denotes a print mode at a time of setting the trimming. The print system in the present embodiment has three print modes of "margin," "no margin" and "division seal sheet," and each of the modes differs in an image aspect ratio of the printed result. If the trimming process is not set by the same aspect ratio as that of the printed result, since an area surrounded by the trimming frame differs from the printed result, the print mode at a time of setting the trimming process has to be held as the trimming data.

A paper type 204 denotes the paper size at a time of setting the trimming process. When the print mode 203 corresponds to the "no margin" or the "division seal sheet," the image aspect ratio of the printed result invites difference according to a paper type. Therefore, the paper type has to be also held as the trimming data for the same reason as that of the print mode 203.

Pointers for trimming frame data 210, 211, 212 and 213 are stored in members 205, 206, 207 and 208. Data of the trimming X coordinate 210 indicates an X coordinate on an image at a left upper corner in the trimming frame. Data of the trimming Y coordinate 211 indicates a Y coordinate on the image at the left upper corner in the trimming frame. Data of the trimming width 212 indicates length in the horizontal direction of the trimming frame. Data of the trimming height 213 indicates length in the vertical direction of the trimming frame. The position and size of the trimming frame are determined by the four data of 210, 211, 212 and 213.

When the plural trimming settings are instructed for one piece of image, the trimming frame data of 210, 211, 212 and 213, the number of which are the same as the number of the trimming settings are prepared, and the position and the size for each of the trimming settings are held.

Since the pointers for each of the trimming frame data are stored in the members 205, 206, 207 and 208, the number of these items corresponds to the number of the trimming settings that were prepared plus one. By setting zero in the last member of the pointer for the trimming frame data (numeral 208 in FIG. 2), it is indicated that the pointer for the trimming frame data does not continue any more. Therefore, the number of the trimming settings and the position and size of the each trimming setting can be known by investigating the trimming data structure object.

Numeral 209 which denotes an image number, indicates to which image the trimming data structure object corresponds. In the images stored in the CF 101, the same plural image numbers do not exist. That is, the one image is indicated by one respective image number.

Figure 9:
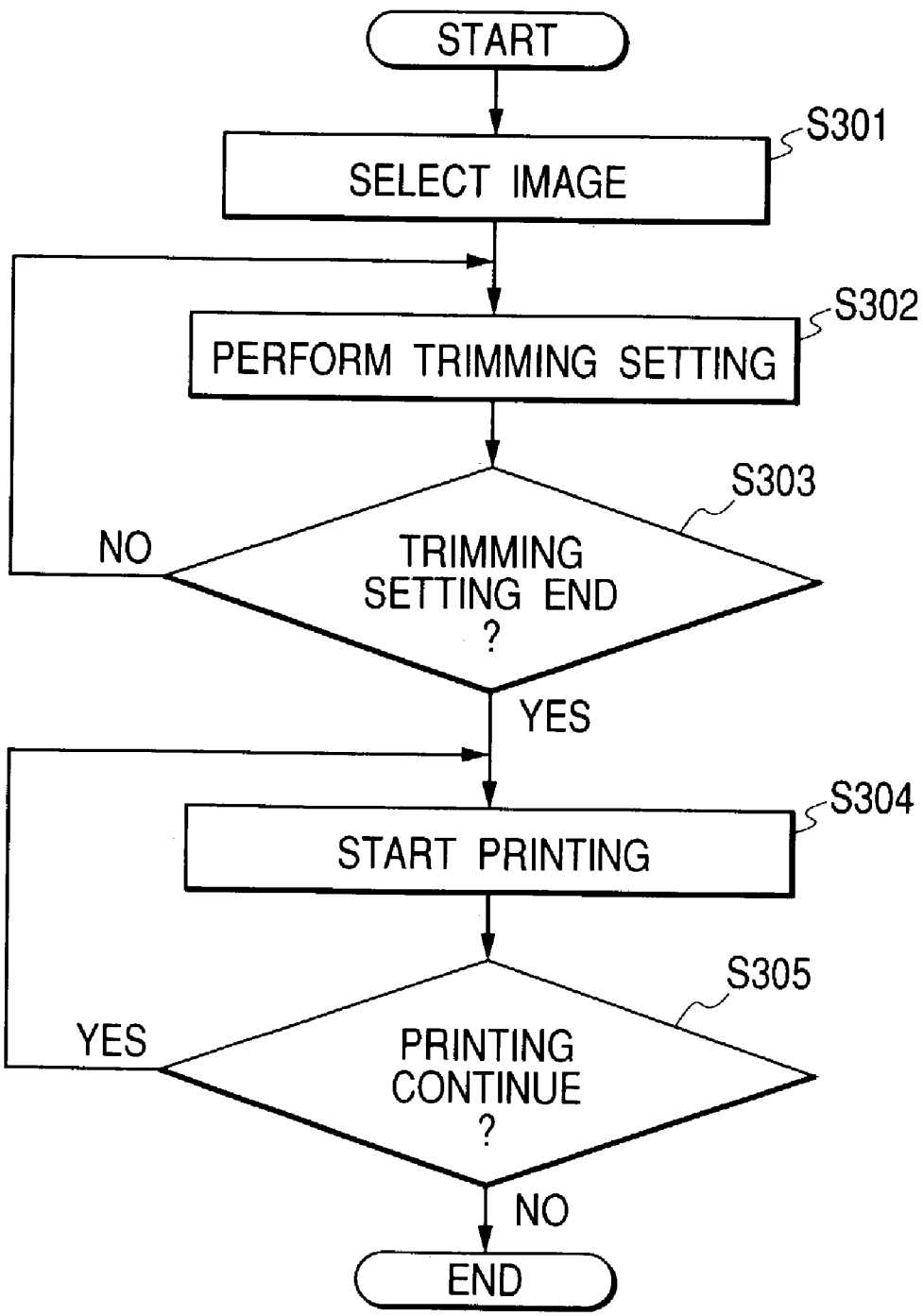
FIG. 9 is a flowchart showing a process flow when printing is performed.

FIG. 9 is a flowchart showing a process flow of reading and storing the trimming data in the print system in the present embodiment.

In a step S301, an image to be printed is selected. In a step S302, the trimming setting operation for the selected image is performed. As to the method of the trimming setting operation, it obeys the above description. At this time, the trimming setting already has been already performed for a target image. That is, if the trimming setting flag 201 is in a state of true, that setting is followed, and the trimming frame data stored in a place of indicated by the pointer for the trimming frame data which starts from the pointer 205 is read, then a trimming setting screen is displayed on the display unit 108 in accordance with the read trimming data. At this time, the size, the position and the longitudinal/lateral directions of the trimming frame to be displayed depend on the read trimming data.

If the trimming data is not stored, the trimming data is not read, and a default trimming frame is generated to display it on the display unit 108.

In a step S303, the end of the trimming setting operation is judged (detected). More particularly, when operating in the trimming setting screen, if the user depresses the SET button 305 in the GUI operation unit 110, since the trimming setting operation is to be continued, a flow returns to the step S302, where the user is enabled to perform the arbitrary number of the trimming settings operations.

When operating in the trimming setting screen, if the user depresses the MENU button 304 in the GUI operation unit 110, the trimming setting operation ends, and processing will be in a state capable of starting the printing operation. Further, if the printing is instructed by a user, the printing is started in a step S304.

The print process is achieved by reading the trimming data shown in FIG. 2, extracting the image in accordance with the trimming frame data of 210, 211, 212 and 213, which were traced from the pointer stored in the member 205 and transmitting data, which was converted into print data, to the printer 120.

When a trimming-processed image print for one sheet ends, it is investigated whether or not the next trimming-processed image print is instructed in a step S305. In the above, since the trimming-processed image print was performed by the trace of the pointer 205 for data 1, the trimming print is performed in accordance with data of the next pointer 206. As long as the pointer for the trimming frame data is not set to zero, the trimming-processed image print is continuously performed similarly. If the pointer for the trimming frame data is set to zero, it is judged that the print process is not be continued in the step S305, and the process ends.

As described above, according to the present embodiment, plural trimming settings operation can be performed for the same image on the same screen, and all the trimming print processes can be set in a single printing operation can be sequentially performed. Accordingly, another trimming setting operation can be performed while comparing it with plural prior trimming settings. As a result, additionally trimming setting can be previously and collectively performed without being kept waiting in the course of the printing, and improved operability can be obtained.

Second Embodiment

In the present embodiment, a case of applying the present invention to panorama printing will be explained. A digital camera in the present embodiment has the same internal structure as that shown in FIG. 1, the same operation unit as that shown in FIG. 3 and the same setting screen as that shown in FIG. 4 can be displayed. Therefore, in the present embodiment, each structural unit having the same function as that in the first embodiment is indicated by the same reference numeral and the detailed description thereof will be omitted. However, in the present embodiment, a JUMP key (not previously shown; see FIG. 13) used for designating an area of the panorama printing is provided in the GUI operation unit 110.

A state of dividing a trimming frame into small lattice-like rectangular areas is shown in FIG. 10. Each of images 1001, 1002, 1003, 1004 and 1005 shown in FIG. 10 occupies an entire portion of an image to be displayed on the display unit 108.

First, the trimming frame corresponding to one sheet of a print output paper is displayed as indicated by the image 1001, and when a right side button of the cross-shaped key is depressed while depressing the JUMP key of the GUI operation unit 110, the trimming frame is enlarged in the right direction and divided into two rectangular areas as indicated by the image 1002. Further, when the right side button of the cross-shaped key is depressed while depressing the JUMP key in the GUI operation unit 110, the trimming frame is enlarged in the right direction, and the trimming frame is divided into three rectangular areas as indicated by the image 1004. Further, when an upper side button of the cross-shaped key is depressed while depressing the JUMP key in the GUI operation unit 110, the trimming frame is enlarged in the upper direction, and the trimming frame is divided into six rectangular areas as indicated by the image 1005.

As above, when the right side button, left side button, upper side button or a lower side button of the cross-shaped key is depressed while depressing the JUMP key in the GUI operation unit 110, the trimming frame is enlarged in each direction and divided into the rectangular areas in each direction. Further, in a state of the trimming frame indicated by the image 1002, by depressing the DISPLAY key 306, the trimming operation in the longitudinal direction also can be performed, as indicated by the image 1003. After setting the position, the size and the longitudinal/lateral directions of the trimming operation to the desired condition, if the MENU key 304 in the GUI operation unit 110 is depressed, the trimming setting is fixed.

After repeating the trimming settings, if the user depresses the MENU key 304 in the GUI operation unit 110 is depressed, the trimming setting ends, and a print dialog box shown in FIG. 4 is displayed on the display unit 108. When in a state of displaying the print dialog box shown in FIG. 4, if the uses print selects the print button 402 is selected while operating the cross-shaped key 303 and the SET button 305, printing is executed in accordance with the trimming setting.

If a print execution is instructed, print data is generated by the print data generation unit 105. In the print data generation unit 105, the image data currently selected is read from the CF 101 through the image selection unit 106 via the I/O control unit 102, and further trimming data is read from the data holding unit 103 to extract a necessary area from the image data in accordance with the trimming data. The extracted image data is converted into data adapted to the connected printer 120 and the converted data is sent to the printer 120 through the communication unit 109.

The printer 120 executes the print process in accordance with the sent print data. After the printing of one sheet ended, data for the next printing is continuously formed in accordance with the trimming setting, and the print data is similarly sent to the printer 120 to execute the next print process in accordance with the trimming setting. In the trimming settings, the print processes are repeated until all the processes end.

FIG. 11 is a view showing the data structure of the trimming data to be stored at a time of performing the trimming setting of an image processing apparatus according to the present embodiment.

Since a trimming setting flag 1101, a trimming cancellation flag 1102, a print mode 1103 and a paper type 1104 shown in FIG. 11 function as the trimming setting flag 201, the trimming cancellation flag 202, the print mode 203 and the paper type 204, the explanation thereof will be omitted here.

Data of a trimming X coordinate 1105 indicates an X coordinate on an image at a left upper corner in an entire trimming frame. Data of a trimming Y coordinate 1106 indicates a Y coordinate on the image at the left upper corner in the entire trimming frame. In case of existing the plural adjacent trimming frames, data of the trimming X coordinate 1105 and data of the trimming Y coordinate 1106 indicate the X coordinate and the Y coordinate of the trimming frame on the left upper portion in the entire frame. Data of a trimming width 1107 indicates the length in the horizontal direction of one trimming frame. Data of a trimming height 1108 indicates length in the vertical direction of one trimming frame. The The number of X-direction trimmings 1109 indicates the number of trimmings in the X-direction. The number of Y-direction trimmings 1110 indicates the number of trimmings in the Y-direction. In a case where only the one trimming frame exists, as the number of X-direction trimmings 1109 and the number of Y-direction trimmings 1110, "1" is recorded for the respective numbers of trimmings. In the case of the image 1005 shown in FIG. 10, the number of X-direction trimmings 1109 corresponds to "3," and the number of Y-direction trimmings 1110 corresponds to "2."

In case of the image 1001 shown in FIG. 10, the trimming frame is not divided, and the number of X-direction trimmings 1109 and the number of Y-direction trimmings 1110 respectively corresponds to "1." When the state shifts from a case of the image 1001 to a case of the image 1002, the trimming frame is divided into two lattice-like rectangular areas, and the number of X-direction trimmings 1109 becomes "2" by adding "1." When the state shifts from a case of the image 1002 to a case of the image 1004, the trimming frame is divided into three lattice-like rectangular areas, and the number of X-direction trimmings 1109 becomes "3" by further adding "1." When the state shifts from a case of the image 1004 to a case of image 1005, the trimming frame is divided into six lattice-like rectangular areas, and the number of X-direction trimmings 1109 is not changed with "3" but the number of Y-direction trimmings 1110 becomes "2" by adding "1." From the contents of the trimming X coordinate 1105 and the trimming Y coordinate 1106, since a trimming frame having the width of (the trimming width 1107×the number of X-direction trimmings 1109) and the height of (the trimming height 1108×the number of Y-direction trimmings 1110) and the divided lattice-like small rectangular areas formed from the trimming width 1107 and the trimming height 1108 consisted of (the number of X-direction trimmings 1109×the number of Y-direction trimmings 1110) pieces are displayed by net-shaped lines, a printed result with each of the output sheets according to the trimming setting can be recognized.

Therefore, the number of print sheets, to which the trimming setting is performed, and the position and the size of each of the trimming settings can be known by investigating the trimming data structure object.

Numeral 1111 which denotes an image number, indicates the image to trimming data structure object shown in FIG. 11 corresponds to what image. With respect to the image number, the same plural image numbers do not exist at the same time in the image processing apparatus according to the present embodiment. The one image is indicated by the image number. After selecting an image to be printed and performing the trimming setting to the selected image, if the trimming setting has been already performed to the target image, that is, the trimming setting flag 1101 in FIG. 11 is in a state of true, that setting is followed, and the trimming setting frame is displayed on the display unit 108. At is time, the size, the position and the longitudinal/lateral directions of the trimming frame to be displayed and each of rectangular areas obtained by dividing the trimming frame into the lattice-like areas depend on the read trimming data. In a case where the trimming data is not stored, the trimming data is not read and a default trimming frame is generated to display it on the display unit 108.

In the trimming setting frame shown in FIG. 4, if the user depresses the MENU button 304 is depressed, a trimming setting ends, and the camera will be in a state capable of starting the printing. Further, if the printing is instructed by a user, a printing operation is started. From the contents of the trimming data shown in FIG. 11, when the trimming frame is divided into the lattice-like rectangular areas, an X coordinate and a Y coordinate of each of the lattice-like rectangular areas can be known by performing the calculation of using the coordinate positions of the trimming X coordinate 1105 and the trimming Y coordinate 1106, the trimming width 1107 and the trimming height 1108.

The printing can be achieved by extracting an image, of which the size and the position are calculated from the trimming data, as to the rectangular areas obtained by dividing the trimming frame into the lattice-like areas for an image of the image number 1111 and transmitting data, which was converted into data for the printing, to the printer 120.

A process flow of reading and storing the trimming data in the print system in the present embodiment is similar to that in the flowchart shown in FIG. 9 in the first embodiment. That is, the trimming setting accompanied by the generation of a panorama area shown in FIG. 10 is performed in the steps S302 and S303, and the print process based on the setting of the panorama area is performed in the steps S304 and S305.

Figure 12:
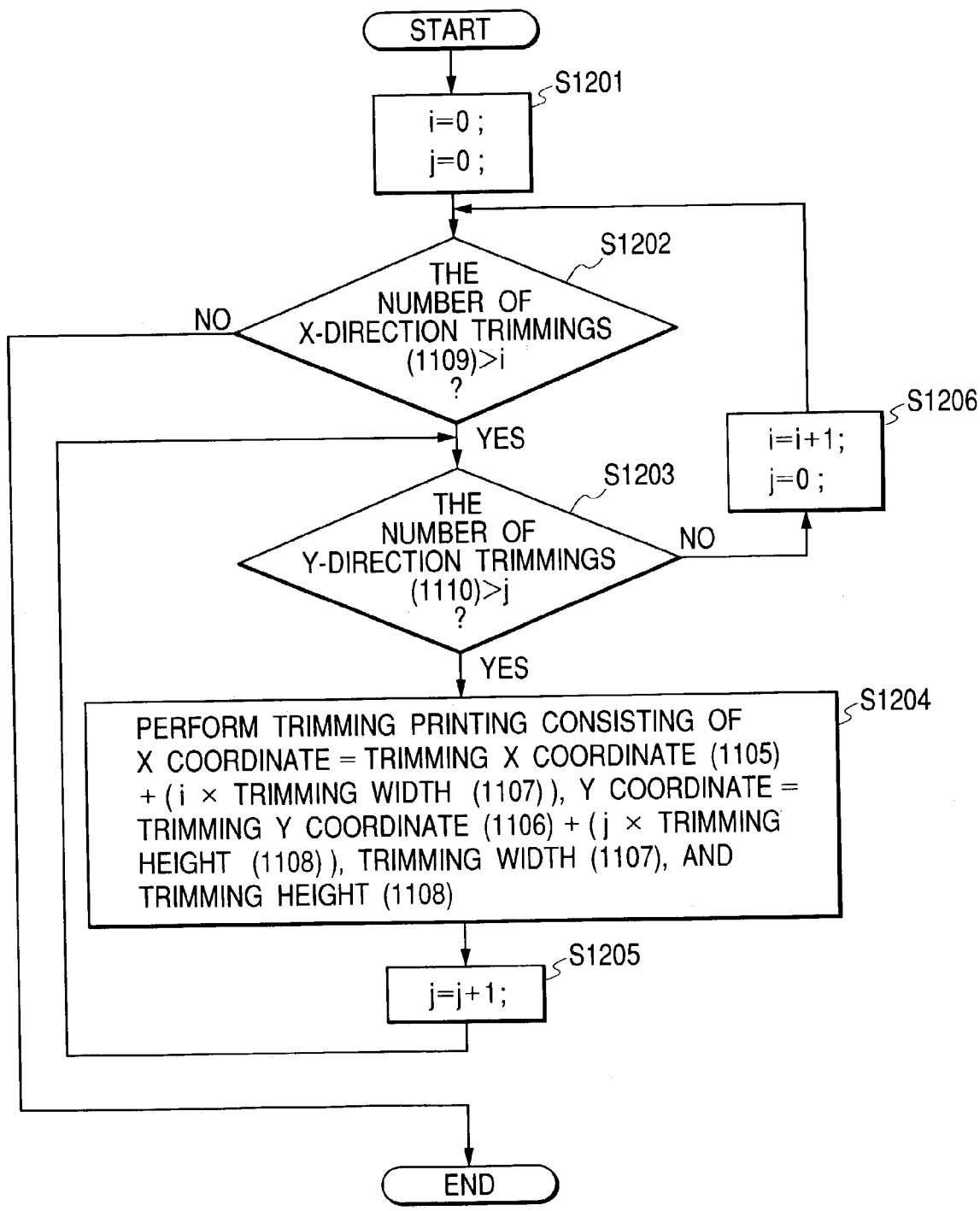
FIG. 12 is a flowchart showing a process flow of trimming-processed image printing in the second embodiment.

Next, a process flow of a trimming print according to the trimming data in the steps S304 and S305 in the present embodiment will be explained in detail with reference to a flowchart shown in FIG. 12.

First, in a step S1201, a numerical value 0 is substituted for parameters i and j. Then, when it is judged that the parameter i is smaller than the number of X-direction trimmings 1109 in a step S1202 and the parameter j is smaller than the number of Y-direction trimmings 1110 in a step S1203, a trimming printing according to an X coordinate=the trimming X coordinate 1105+(i×the trimming width 1107), a Y coordinate=the trimming Y coordinate 1106+(j×the trimming height 1108), the trimming width 1107 and the trimming height 1108 is executed in a step S1204.

When one trimming printing ends, "1" is added to the parameter j in a step S1205 and the trimming print processes in step S1204 are repeated for so long as the parameter j is smaller than the number of Y-direction trimmings 1110 (a case of yes in step S1203). When the parameter j is equal to the number of Y-direction trimmings 1110, "1" is added to the parameter i, and "0" is substituted for the parameter j in a step S1206. In this manner, the trimming print processes are continuously executed until the parameter i becomes equal to the number of X-direction trimmings 1109.

Thus, according to the embodiment of the present invention, in the case of forming a panorama image by arranging print outputs of plural sheets formed by the trimming process executed in the same sized adjacent areas, the trimming setting of image groups corresponding to the lattice-like small rectangular areas can be performed by a simple operation and each printing of those image groups can be sequentially performed by the once printing operation. As a result, a trimming setting can be previously and collectively performed without being kept waiting in the course of the print process can be obtained.

Other Embodiment

In the above embodiments, an example of extracting an area, to which a trimming process is instructed, from image data stored in a camera, generating print data which can be interpreted by a printer, transmitting the generated data to the printer and executing a print process by the printer in accordance with the transmitted print data, in a print system wherein the camera is connected to the printer has been explained.

If a printer which has the function of the print data generation unit 105 in the above embodiments is provided, it is possible to transmit the image data itself read from the CF 101 and the trimming data read from the data holding unit 103 to the printer via the communication unit 109, extract the area, to which the trimming process is instructed, from the image data on the basis of the transmitted image data and the trimming data in the printer, generate data necessary for the print from the extracted data and execute the print process. An effect of the present invention can be sufficiently demonstrated by both of the methods.

Figure 13:
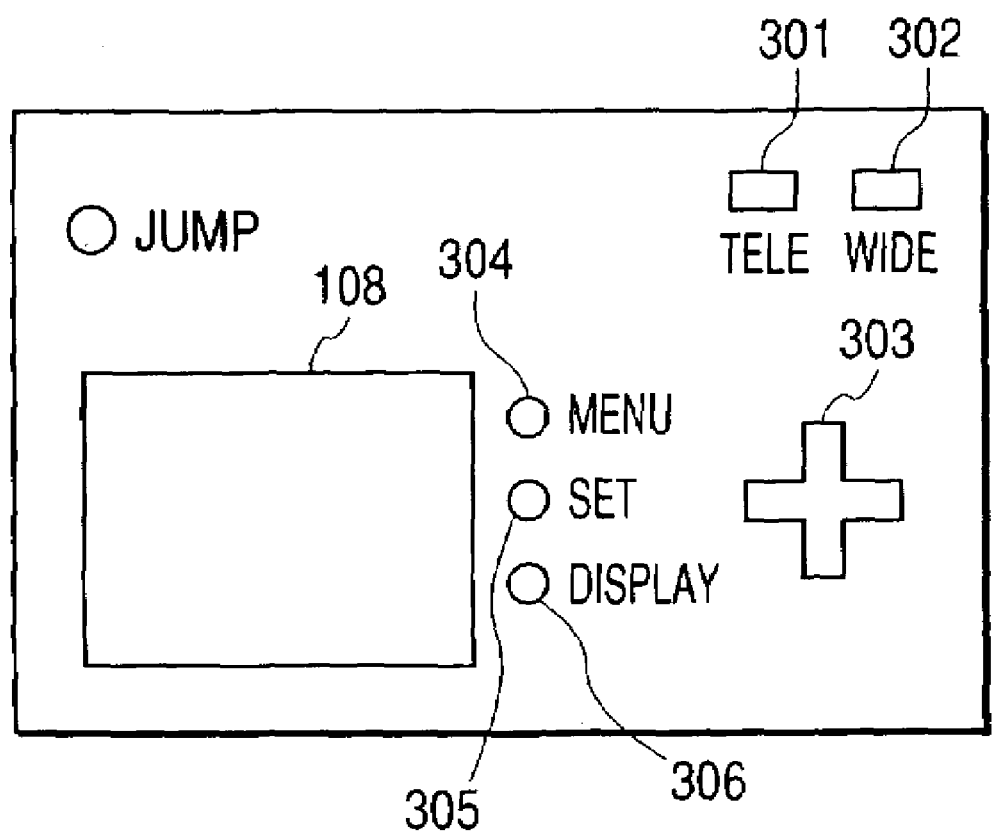
FIG. 13 is a view showing an example of a JUMP key provided on the GUI operation unit shown in FIG. 3.

Incidentally, as shown in FIG. 13, the JUMP key may be provided on, e.g., the GUI operation unit of FIG. 3. Moreover, if the trimming setting in the first embodiment and the trimming setting in the second embodiment are provided respectively as independent modes, the keys such as the WIDE key, the TELE key and the like other than the JUMP key, may be used as the keys having the same function as that of the JUMP key.

The present invention can be similarly applied to such a printer which has an image display unit and a mounting unit for mounting the CF 101.

Further, the present invention can be applied to such the structure of providing the above process to a digital camera or a printer through a storage medium as firmware.

It is needless to say that an object of the present invention can be achieved in a case where a storage medium storing the program codes of software for realizing the functions of the above embodiments is supplied to a system or an apparatus and then a computer (or CPU or MPU) in the system or the apparatus reads and executes the program codes stored in the storage medium.

In this case, the program codes themselves read from the storage medium realize the functions of the above embodiments, and the storage medium storing such the program codes constitute the present invention.

As the storage medium for supplying the program codes, for example, a flexible disk, a hard disk, an optical disk, a magnetooptical disk, a CD-ROM, a CD-R, a magnetic tape, a non-volatile memory card, a ROM or the like can be used.

It is needless to say that the present invention includes not only a case where the functions of the above embodiments are realized by the execution of the program codes read by the computer, but also a case where an OS (operating system) or the like functioning on the computer executes all the process or a part thereof according to the instructions of the program codes, thereby realizing the functions of the above embodiments.

Further, it is needless to say that the present invention includes a case where the program codes read from the storage medium are first written in a memory provided in a function expansion board inserted in the computer or a function expansion unit connected to the computer, then a CPU or the like provided in the function expansion board or the function expansion unit executes all the process or a part thereof according to the instructions of such the program codes, thereby realizing the functions of the above embodiments.

As apparent from the above explanation, according to the present invention, since the arbitrary number of division areas are set for a partial area or all the area of image data and the sequential printing of image data corresponding to each of the division areas is enabled, the setting of the division areas being the target to be printed does not be performed every time while comparing the display image with a printed result. As a result, usability can be improved, for example, in the trimming printing.

According to the present invention, since image data corresponding to each of the division areas is transmitted from an image processing apparatus to a printer, it is not required to perform an extraction of the image data or the trimming setting at the printer side. As a result, it becomes possible to perform the sequential printing of the image data corresponding to each of the division areas.

Further, according to the present invention, since information and image data regarding the division areas are transmitted from the image processing apparatus to the printer, the image data corresponding to each of the division areas is generated, and it becomes possible to perform the sequential printing of the generated data. Accordingly, transference of the information from the image processing apparatus to the printer ends only once. As a result, effective use of network resources can be obtained.

As described above, the present invention has been explained on the basis of the preferable embodiments. However, the present invention is not limited to the above embodiments, but may be modified in various manners within the scope of the following claims.

What is claimed is:

1. An image reproduction apparatus comprising:
   a selection unit adapted to select an image to be printed from among plural images stored on a recording medium;
   a display unit adapted to display the selected image;
   a display control unit adapted to superpose plural trimming frames on the selected image displayed by said display unit;
   an operation unit adapted to set a location and a size of a trimming frame to the selected image displayed by said display unit;
   a changeover unit adapted to, after setting the trimming frame by said operation unit, change over to setting of a next trimming frame;
   an indication unit adapted to indicate to decide the settings of the plural trimming frames; and
   a storage unit adapted to store trimming frame information representing the plural trimming frames already set up,
   wherein said display control unit causes to display the trimming frame to be operated as a result of the changeover of said changeover unit, with as color different from colors of the trimming frames already set up.

2. An image reproduction apparatus according to claim 1, wherein said display control unit causes said display unit to display a new trimming frame as the trimming frame to be operated next, according to the changeover by said changeover unit.

3. An image reproduction apparatus according to claim 2, wherein said display control unit causes to display the new trimming frame at the center of said display unit.

4. An image reproduction apparatus according to claim 1, further comprising:
an output unit adapted to sequentially output plural trimming images based on the trimming frame information stored in said storage unit.

5. An image reproduction apparatus according to claim 4, wherein
said image reproduction apparatus includes a digital camera, and
said output unit outputs the plural trimming images to a printer connected to the digital camera.

6. A method comprising:
a selection step for selecting an image to be printed from among plural images stored on a recording medium;
a display step for displaying the selected image;
a display control step for superposing plural trimming frames on the same selected image displayed in said display step;
an operation step adapted to set a location and a size of a trimming frame to the selected image displayed in said display step;
a changeover step adapted to, after setting the trimming frame in said operation step, change over to setting of a next trimming frame;
an indication step adapted to indicate to decide the settings of the plural trimming frames; and
a storage step adapted to store trimming frame information representing the plural trimming frames already set up,
wherein said display control step causes to display the trimming frame to be operated as a result of the changeover in said changeover step, with a color different from colors of the trimming frames already set up.

7. An method according to claim 6,
wherein said display control step causes display of a new trimming frame as the trimming frame to be operated next, according to the changeover by said changeover step.

8. A method according to claim 6, wherein said display control step causes to display the new trimming frame at the center of a display unit.

9. A method according to claim 6, further comprising:
an output step adapted to sequentially output plural trimming images based on the trimming frame information stored in said storage step.

10. A method according to claim 9, wherein
said method is performed in a digital camera, and
said output step outputs the plural trimming images to a printer connected to the digital camera.

11. A print system comprising:
a selection unit adapted to select, from among plural images stored in a recording medium, an image as a print target;
a display unit adapted to display the selected image;
a display control unit adapted to enable plural trimming frames to be superposed and displayed on the selected image displayed by said display unit;
an operation unit adapted to set a location and a size of a trimming frame to the selected image displayed on said display unit;
a changeover unit adapted to, after setting the trimming frame by said operation unit, change over to setting of a next trimming frame;
an indication unit adapted to indicate to decide the settings of the plural trimming frames; and
a storage unit adapted to store trimming frame information representing the plural trimming frames already set up,
wherein said display control unit causes to display the trimming frame to be operated as a result of the changeover of said changeover unit with a color different from colors of the trimming frames already set up.

12. A print system according to claim 11, wherein said display control unit causes to display a new trimming frame as the next trimming frame according to the changeover by said changeover unit.

13. A print system according to claim 12, wherein said display control unit causes to display the next trimming frame at the center of said display unit.

14. A print system according to claim 11, further comprising a print unit adapted to sequentially print plural trimming areas based on the trimming frame information representing the plural trimming frames stored in said storage unit.

* * * * *

UNITED STATES PATENT AND TRADEMARK OFFICE
CERTIFICATE OF CORRECTION

PATENT NO. : 7,286,161 B2
APPLICATION NO. : 10/368617
DATED : October 23, 2007
INVENTOR(S) : Hitoshi Watanabe et al.

It is certified that error appears in the above-identified patent and that said Letters Patent is hereby corrected as shown below:

ON THE COVER PAGE
At item (59), Abstract, line 4, "set" should read --set with respect--.

COLUMN 1
Line 17, "case" should read --the case--.
Line 20, "trimming" should read --a trimming--.
Line 26, "case" should read --the case--.
Line 27, "operation" should read --operations--, and "the" should be deleted.
Line 31, "case" should read --the case--.
Line 32, "the" should read --an--.
Line 34, "the" should be deleted.
Line 38, "the" should read --this--.
Line 39, "setting" should read -setting operation--.
Line 41, "the" should read --an--.
Line 42, "the" should read --a--.
Line 44, "the" should be deleted.
Line 48, "a" should be deleted.
Line 49, "the" should be deleted.
Line 50, "trimmings operation" should read --trimming operations--.
Line 56, "next" should read --the next--.

COLUMN 2
Line 3, "the" should be deleted (both occurrences).
Line 4, "the" should be deleted.
Line 14, "trimming processed" should read --trimming-processed--.
Line 15, "the" should be deleted.
Line 16, "the" should be deleted.
Line 28, "is to execute" should read --executes--.
Line 29, "present" should read --present invention--.
Line 31, "a" should be deleted.
Line 32, "a" should be deleted, and "areas" should read --areas with respect--.
Line 42, "is to execute" should read --executes--.
Line 44, "present" should read --present invention--.
Line 47, "a" should be deleted.
Line 48, "a" should be deleted, and "areas" should read --areas with respect--.
Line 51, "the set" should be deleted.
Line 56, "operation" should read --operations--.
Line 57, "execute" should read --executes--.
Line 59, "present" should read --present invention--.
Line 64, "areas" should read --areas with respect--.

UNITED STATES PATENT AND TRADEMARK OFFICE
CERTIFICATE OF CORRECTION

PATENT NO. : 7,286,161 B2
APPLICATION NO. : 10/368617
DATED : October 23, 2007
INVENTOR(S) : Hitoshi Watanabe et al.

It is certified that error appears in the above-identified patent and that said Letters Patent is hereby corrected as shown below:

COLUMN 3
Line 2, "means." should read --setting means.--.
Line 17, "trimming settings" should read --a trimming setting operation--.
Line 19, "the" should read --a--.
Line 20, "setting" should read --setting operation--.
Line 21, "the" should read --a--.
Line 22, "setting" should read --setting operation--.
Line 23, "the" should read --a--.
Line 24, "setting" should read --setting operation--.
Line 28, "the" should read --a--.
Line 33, "of" should read --of a--.
Line 34, "printing" should read --printing operation--.
Line 42, "the embodiments" should read --preferred embodiments--.
Line 50, "CF (Compact Flash) 101 being a removal" should read --CF (Compact Flash) 101, which is a removable--.
Line 56, "users" should read --user's--.
Line 63, "trimming" should read --a trimming--.
Line 65, "In" should read --At--, and "a operation" should read --an operation--.

COLUMN 4
Line 2, "image" should read --the image--.
Line 4, "designated" should read --the designated--.
Line 7, "a display" should read --the display--.
Line 9, "are" should read --is--, and "image by" should read --an image--.
Line 13, "the plural" should read --plural--.
Line 15, "requires" should read --requests--.
Line 16, "a display to" should read --the display from--, and "unit 102" should read --unit 102,--.
Line 21, "in" should read --of--.
Line 22, "the" should read --a--.
Line 23, "setting" should read --setting operation--, and "by using such a screen" should read --using a screen such--.
Line 24, "When a" should read --When the user depresses the--, and "in" should read --of--.
Line 28, "and selects" should read --so as to select--.
Line 29, "depress" should read --depresses--, and "in" should read --of--.
Line 34, "screen by" should read --screen, e.g., in--.
Line 37, "image" should read --image,--.
Line 39, "left" should read --left,--.

UNITED STATES PATENT AND TRADEMARK OFFICE
CERTIFICATE OF CORRECTION

| | | |
|---|---|---|
| PATENT NO. | : 7,286,161 B2 | |
| APPLICATION NO. | : 10/368617 | |
| DATED | : October 23, 2007 | |
| INVENTOR(S) | : Hitoshi Watanabe et al. | |

It is certified that error appears in the above-identified patent and that said Letters Patent is hereby corrected as shown below:

COLUMN 4, Cont'd.
Line 40, "in" should read --of--.
Line 45, "is" should read --is being--.
Line 46, "depress" should read --depresses--.
Line 47, "After the" should read --After--.
Line 51, "in" should read --of--.
Line 53, "depress" should read --depresses--, and "in" should read --of--.
Line 58, "condition," should read --conditions,--.
Line 61, "then" should read --and then--.
Line 63, "operation" should read --operations--.
Line 65, "and the cross-shape key 303" (second occurrence) should be deleted.
Line 66, "does not give" should read --do not have--.
Line 67, "frame 501 but becomes an" should read --frame 501, but perform--.

COLUMN 5
Line 1, "operation for the" should read --operation for a--.
Line 2, "frame" should read --frame 502--.
Line 4, "in" should read --at--.
Line 6, "comparing" should read --comparing it--.
Line 8, "can be" should read --is--.
Line 9, "the" should read --a--.
Line 10, "maybe" should read --may--.
Line 13, "repeating the" should read --repeating--.
Line 14, "in" should read --of--.
Line 16, "FIG. 4" should read --FIG. 4 again--, and "again" should be deleted.
Line 17, "FIG. 4," should read --FIG. 4--.
Line 19, "in" should read --of--.
Line 35, "After the" should read --After--; "sheet" should read --sheet has--, and "for the" should read --for--.
Line 47, "length of four bytes data." should read --a length of four bytes of data.--.
Line 49, "take" should read --take one of--.
Line 53, "whatever" should be deleted.
Line 55, "that the trimming setting" should read --as if a trimming setting operation--.
Line 58, "values of" should read --values:--.
Line 62, "the trimming setting is" should read --a trimming setting operation has been--.
Line 64, "values," should read --values;--.

UNITED STATES PATENT AND TRADEMARK OFFICE
CERTIFICATE OF CORRECTION

PATENT NO. : 7,286,161 B2
APPLICATION NO. : 10/368617
DATED : October 23, 2007
INVENTOR(S) : Hitoshi Watanabe et al.

It is certified that error appears in the above-identified patent and that said Letters Patent is hereby corrected as shown below:

COLUMN 6
Line 17, "as the" should read --as--.
Line 31, "the" should be deleted.
Line 33, "are" should read --is--.
Line 34, "are" should read --that were--.
Line 42, "any more." should read --anymore.--.
Line 44, "the" should be deleted.
Line 46, "Numeral 209" should read --Numeral 209,--.
Line 49, "The one" should read --each--.
Line 54, "In a" should read --In--, and "a step" should read --step--.
Line 58, "already performed" should read --performed--.
Line 61, "of" should be deleted.
Line 62, "data" should read --data,--, and "pointer 205" should read --pointer 205,--.
Line 63, "read, then" should read --read. Then,--.

COLUMN 7
Line 2, "to" should read --as to--.
Line 4, "a" should be deleted.
Line 7, "in" should read --of--.
Line 8, "a" should be deleted, and "the" should be deleted.
Line 9, "perform the" should read --perform an--.
Line 10, "the" should be deleted.
Line 12, "in" should read --of--.
Line 14, "the" should read --a--; "the printing" (first occurrence) should read --a printing operation--; "a" should read --the--; and "the printing" (second occurrence) should read --printing--.
Line 16, "a" should be deleted.
Line 21, "205" should read 205,--, and "data," should read --the data,--.
Line 24, "the" should read --a--.
Line 25, "a" should be deleted.
Line 28, "trimming" should read --trimming-processed image--.
Line 33, "be" should read --to be--, and "the" should be deleted.
Line 36, "settings operation" should read --setting operations--.
Line 38, "can" should be deleted.
Line 39, "be" should read --and--, and "another" should read --an additional--.
Line 43, "without" should read --without the user--, and "the" should be deleted.
Line 51, "FIG. 3" should read --FIG. 3,--.
Line 56, "omitted." should read --omitted here.--.

UNITED STATES PATENT AND TRADEMARK OFFICE
CERTIFICATE OF CORRECTION

PATENT NO. : 7,286,161 B2
APPLICATION NO. : 10/368617
DATED : October 23, 2007
INVENTOR(S) : Hitoshi Watanabe et al.

It is certified that error appears in the above-identified patent and that said Letters Patent is hereby corrected as shown below:

COLUMN 8
Line 6, "key" should read --key again--.
Line 7, "in" should read --of--.
Line 8, "frame" should read --frame again--.
Line 12, "in" should read --of--.
Line 16, "above," should read --described above,--.
Line 17, "a" should be deleted.
Line 18, "in" should read --of--.
Line 19, "each" should read --the respective--.
Line 20, "the" should be deleted.
Line 21, "a state" should read --the display state--.
Line 22, "by depressing" should read --if the user depresses--, and
        "the" should read --a--.
Line 27, "MENU key 304" should read --user depresses the MENU key 304--, and
        "Unit 110 is depressed," should read --unit 110,--.
Line 29, "the" (first occurrence) should be deleted.
Line 30, "in" should read --of--, and "unit 110" should read --unit 110,--.
Line 31, "is depressed," should be deleted, and "ends," should read --operation ends,--.
Line 34, "uses print" should read --user--, and "is" should be deleted.
Line 35, "selected" should be deleted, and "the" should read --depressing the--.
Line 50, "ended," should read --has ended,--.
Line 62, "function" should read --function the same--.
Line 64, "type 204," should read --type 204 in FIG. 2,--.
Line 67, "a" should read --the--, and "an entire" should read --the entire--.

COLUMN 9
Line 3, "case of existing the" should read --a case where--.
Line 10, "length" should read --the length--.
Line 15, "the" (first occurrence) should be deleted.
Line 18, "the" (first occurrence) should be deleted.
Line 22, "case of the" should read --the case of--.
Line 25, "corresponds" should read --correspond--.
Line 26, "the" should be deleted (first and second occurrences).
Line 30, "the" should be deleted (first and second occurrences).
Line 34, "the" (first occurrence) should be deleted.
Line 36, "is not" should read --remains unchanged at--.
Line 37, "changed with" should be deleted.

UNITED STATES PATENT AND TRADEMARK OFFICE
CERTIFICATE OF CORRECTION

PATENT NO. : 7,286,161 B2
APPLICATION NO. : 10/368617
DATED : October 23, 2007
INVENTOR(S) : Hitoshi Watanabe et al.

It is certified that error appears in the above-identified patent and that said Letters Patent is hereby corrected as shown below:

COLUMN 9, Cont'd.
Line 45, "consisted" should read --consisting--.
Line 54, "numeral 1111" should read --Numeral 1111,--.
Line 55, "to trimming" should read --to which the trimming--.
Line 56, "corresponds to what image." should read --corresponds--.
Line 65, "is time," should read --this time,--.

COLUMN 10
Line 5, "it" should read --the image--.
Line 7, "button 304 is depressed," should read --button 304,--.
Line 8, "setting" should read --operation--.
Line 9, "the" (both occurrences) should be deleted.
Line 12, "the" should be deleted.
Line 14, "The" should read --a--.
Line 15, "of using" should read --using--.
Line 16, "1105 and" should read --1105,--.
Line 22, "1111" should read --1111,--, and "data," should read --the data,--.
Line 30, "the" (first occurrence) should be deleted.
Line 31, "the" (third occurrence) should be deleted.
Line 41, "a" should be deleted.
Line 46, "a" should be deleted.
Line 49, "a" should be deleted.
Line 55, "a" should be deleted.
Line 59, "the embodiment" should read --this embodiment--.
Line 62, "the" (first occurrence) should be deleted.
Line 66, "the once" should read --a single--.

COLUMN 11
Line 2, "process can be obtained." should read --process.--.
Line 21, "print" should read --print process--.
Line 29, "the keys" should read --keys--.
Line 30, "like" should read --like,--.
Line 36, "such the" should read --such a--.
Line 37, "of" should be deleted.
Line 42, "apparatus" should read --apparatus,--.
Line 47, "such the" should read --such--.
Line 48, "constitute" should read --constitutes--.
Line 65, "in" should read --into--.

UNITED STATES PATENT AND TRADEMARK OFFICE
CERTIFICATE OF CORRECTION

PATENT NO. : 7,286,161 B2
APPLICATION NO. : 10/368617
DATED : October 23, 2007
INVENTOR(S) : Hitoshi Watanabe et al.

It is certified that error appears in the above-identified patent and that said Letters Patent is hereby corrected as shown below:

COLUMN 12
Line 2, "such the" should read --such--.
Line 5, "apparent" should read --will be apparent--.
Line 6, "the" should read --an--.
Line 7, "data" should read --data,--.
Line 10, "not be" should read --not have to be--.
Line 11, "every" should read --each--.
Line 19, "the" (first occurrence) should be deleted.
Line 24, "the" (first occurrence) should be deleted.
Line 25, "the" should be deleted.
Line 28, "ends" should read --occurs--.
Line 57, "as" should read --a--.

COLUMN 14
Line 37, "next" should read --new--.

Signed and Sealed this

Seventeenth Day of February, 2009

JOHN DOLL
*Acting Director of the United States Patent and Trademark Office*